United States Patent [19]
Lucien

[11] 3,796,039
[45] Mar. 12, 1974

[54] ELECTRIC MICROMOTOR

[76] Inventor: Paul Emile Lucien, 29, rue Pouchet, Amouriq, 75017 Paris, France

[22] Filed: July 12, 1972

[21] Appl. No.: 271,013

[30] Foreign Application Priority Data
July 16, 1971 France................................ 7126136

[52] U.S. Cl......................... 58/23, 310/49, 310/207, 310/268, 58/26 A
[51] Int. Cl. ............................................ H02k 37/00
[58] Field of Search ............. 310/49, 156, 268, 168, 310/207; 58/23 R, 23 D, 26 A

[56] References Cited
UNITED STATES PATENTS

| | | | |
|---|---|---|---|
| 3,652,884 | 3/1972 | Uuffray................................ | 58/23 D |
| 3,097,319 | 7/1963 | Henry-Baudot................. | 310/268 X |
| 3,090,880 | 5/1963 | Raymond............................ | 310/268 |
| 3,292,023 | 12/1966 | Kober.............................. | 310/268 X |
| 3,204,136 | 8/1965 | Kaiwa et al. .......................... | 310/49 |
| 3,230,406 | 1/1966 | Henry-Baudot................. | 310/268 X |
| 3,226,586 | 12/1965 | Henry-Baudot................. | 310/268 X |
| 3,093,762 | 6/1963 | Henry-Baudot................. | 310/268 X |

*Primary Examiner*—D. F. Duggan
*Attorney, Agent, or Firm*—Steinberg & Blake

[57] ABSTRACT

An electric motor consisting of a stator and of an axially magnetized rotor disk is provided with a statoric winding in the form of an insulating wafer carrying an electric circuit formed by way of electro-deposition, to which are fed pulses of alternate polarities causing said motor to rotate step by step. Such a motor can exhibit minute dimensions of the order of a few tens of an inch, and thus can be used for driving the movement of a watch or the like.

7 Claims, 5 Drawing Figures

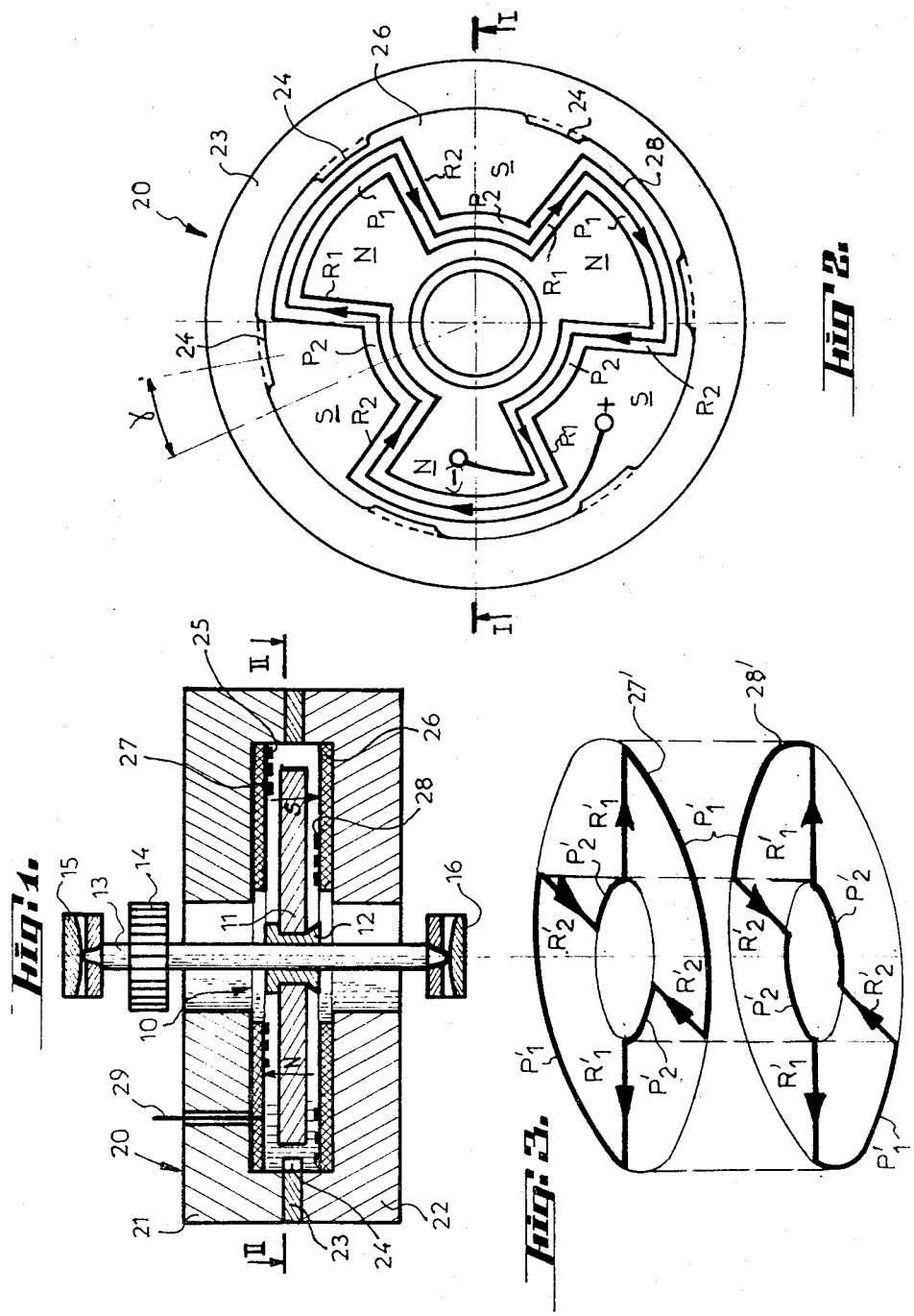

ELECTRIC MICROMOTOR

The present invention relates to an electric micromotor rotating step by step or stepping motor having very small dimensions, e.g. on the order of a few millimeters, intended in particular to drive the movement of a timing or time-keeping apparatus such as a wrist watch.

The making of an electric motor having such dimensions and the operating reliability require for the application considered give rise to difficult technical problems which cannot be solved unless the structure of the motor is simplified as much as possible ; to this end it is desirable, in particular, that the motor should be provided with neither a mobile contact nor a commutation or switching member. Consequently, such a motor is advantageously constituted by a permanently magnetized rotor and a stator comprising a magnetic circuit closed by the said rotor and a winding supplied with alternate-polarity impulses.

While the use of modern magnetic materials practically eliminates any major problem in the making of the rotor and the magnetic circuit of the stator of such a motor, the winding of its stator cannot be achieved in a conventional manner by means of wire coils or even by means or printed circuits, the manufacturing accurcay of which is insufficient for the dimensions considered.

The present invention is therefore directed at solving this problem by providing an electric micromotor of the type considered, the structure of which is so designed as to enable the winding of its stator to be performed readily by means of a technical method ensuring the required accuracy.

To this end, an electric micromotor according to the invention is essentially characterized in that at least one face of its disk-shaped rotor carries axial-field magnetic poles arranged in circular symmetry and having alternate polarities, and the winding of its stator is constituted by at least one annular insulating plate arranged in coaxial relationship to the said rotor and in confronting relationship to the said poles, and at least one face of which carries an electric circuit formed by way of electro-deposition and comprising substantially radial branches distributed in circular symmetry and interconnected by alternate internal and external peripheral junctions.

The general structure of such a motor enables it to be given very small overall dimensions by means of a technical methods which are simple to carry out and considerably facilitate its manufacture while at the same time ensuring the required reliability in operation. For instance, the rotor may be simply constituted by a magnet disk made from ferrite or hard magnetic alloy, or by a disk-shaped support carrying pieces of hard magnetic material arranged at its periphery or at least one face of which is coated with a film of magnetizable material based for instance on metal oxides, both of these solutions enabling distinctly localized permanent magnetic poles to be formed. Moreover, for the formation of the electric circuit of the stator winding way of electro-deposition ensures a manufacturing accuracy which cannot be obtained by any other technical means. Indeed, according to this electro-deposition method, an optical image of the desired electric circuit is cast to the required scale onto a plate of photoconductive material so as to form at its surface an electric image of the said circuit, onto which are selectively deposited metal particles intended to form the circuit ; the combined use of such optical projection and metallization techniques, e.g. by electrochemical means, ensures a detail sharpness which is not obtainable by other technical means; for instance, it is possible to form by way of electro-deposition several tens of parallel conductors per linear millimeter, an order of magnitude which is perfectly compatible with the needs of the present invention.

Consequently, and according to other features of the invention, each radial branch of the said electric circuit comprises advantageously several conductors arranged side by side, each of the said peripheral junctions interconnecting in series two conductors pertaining to two consecutive radial branches, so as, preferably, to interconnect in turn and in series all the conductors of all the said radial branches. In this way, the winding of a motor according to the invention is constituted by a single series circuit, the high impedance of which is compatible with its feeding from an electric impulse generator which is itself supplied from low-capacity cells such as mercury cells. Of course, other types of junctions for interconnecting the conductors of the radial branches of the electric circuit may be used.

According to other features of the micromotor of the invention, the winding of its stator comprises at least two similar electric circuits formed respectively on the mutually opposite faces of one and the same insulating plate or on two separate plates arranged back to back on one and the same side of the rotor or on either side of the latter.

Obviously, such features allow of greater flexibility in the arrangement of the stator winding.

According to still other features of the invention, the like radial branches pertaining to the said two electric circuits respectively and through which the currents flow in one and the same direction, are arranged in axial alignment ; advantageously, two consecutive radial branches of one of the circuit being interconnected by external peripheral junctions, the like radial branches of the other circuit are interconnected by internal peripheral junctions, and vice-versa.

As a result of this, the undesired electro-magnetic and electrodynamic stresses are compensated for in the aggregate and the eddy-current losses are reduced as much as possible.

Lastly, the micromotor according to the invention is characterized in that the magnetic circuit of its stator is locally enlarged at at least one point of its periphery or at the most at two points arranged in circular symmetry and each of which is unequally distant from the adjacent radial branches of the said winding.

Such an arrangement, which enables the effect of least reluctance to be utilized, offers the advantage of enabling the stop positions of the rotor to be fixed and, if needed, to be adjusted, and therefore the magentic forces to which it is subjected upon starting to be directed ; consequently, one direction of rotation of the rotor is privileged by this sole arrangement.

Other features and advantages of the micromotor according to the invention will appear more clearly from the following detailed description of one non-limitative example of embodiment illustrated by the appended drawings wherein :

FIG. 1 is a diagrammatic axial sectional view of a six-pole micromotor according to the invention ;

FIG. 2 is a sectional view of the same micromotor upon the line II—II of FIG. 1, the rotor being omitted;

FIG. 3 is a perspective sketch illustrating the relative arrangement of the electric circuit of a winding of the stator.

Figure 5:
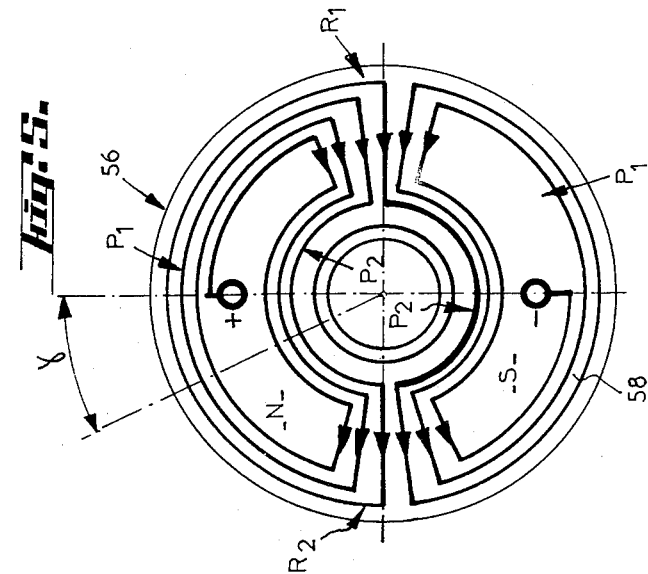
FIGS. 4 and 5 are views similar, respectively, to those of FIGS. 1 and 2, showing two-pole micromotor.

The micromotor shown diagrammatically in FIGS. 1 and 2 comprises essentially a rotor 10 and a stator 20. The rotor 10 is simply constituted by an annular disk 11 of ferrite or any other hard magnetic material, provided with a hub 12 fitted onto a pointed arbor 13 carrying a pinion 14 and the ends of which pivot in bearings 15, 16. In a manner known per se, the disk 11 is so magnetized as to be provided on each of its faces with an even number of magnetic poles distributed in circular symmetry and having alternate polarities as shown symbolically by the arrows N, S. The stator 20 is essentially constituted by two annular cup-shaped members 21, 22 made from a mild magnetic material, arranged on either side of the disk 11 of the rotor 10 and magnetically interconnected at their external peripheries by an intended crown 23 made for instance from mild steel and provided with a number of internal projections 24 equal to the number of poles of the rotor 10. On the internal faces of the cup-shaped members 21, 22 are secured respectively two annular plates 25, 26 made from an insulating material extending in confronting relationship to the faces of the disk 11 of the rotor and on which are formed, respectively, two electric circuits 27, 28 which together form the motor winding supplied through lead-in wires such as 29.

According to an essential aspect of the invention, each of the electric circuits 27, 28 is formed on the corresponding insulating plate 25, 26 by a method of electro-deposition consisting in forming by way of optical projection on a substrate of photo-conductive material an electric image of the desired circuit, and then causing metal particles to be deposited on the said electric image, e.g. by means of an electro-chemical process. Circuits comprising parallel conductors arranged very close to one another, e.g. 50 such conductors per millimeter, can be obtained by such a method.

The configuration of the electric circuit 27, 28 is illustrated in FIG. 2. Each of the said circuits is constituted by a single conductor arranged in several turns on the corresponding plate along an indented path comprising equidistant radial branches R1, R2 interconnected by alternate external and internal peripheral junctions P1, P2. Consequently, each radial branch R1, R2, comprises a number of parallel conductors equal to the number of turns of the circuit on the plate. The terminals of each circuit thus formed are connected to a greater supplying the circuit with electric alternate-polarity impulses. It is readily understood that when the impulse polarity is as shown, the currents flowing through the said branches are respectively centrifugal and centripetal, whereas during the impulses of opposite polarity this situation is inversed.

The electric circuit 28 shown in FIG. 2 comprises six radial branches R1, R2, each of which is formed of three parallel conductors, each of the latter being connected in series, through the medium of peripheral junctions P1, P2, with two conductors of the adjacent radial branches. The electric circuit 27 formed on the plate 25 located on the other side of the disk 11 of the rotor 10 has the same configuration and is arranged angularly with respect to the circuit 28, so that their radial branches R1, R2 are in axial alignement but the external peripheral junctions P1 of one of them correspond to the internal peripheral connections P2 of the other, as shown diagrammatically by the sketch in FIG. 3. The two electric circuits thus arranged are so fed that the currents flowing simultaneously through their axially aligned radial branches are in one and the same direction. Therefore, the two circuits form together a six-pole winding composed of two coils shifted geometrically with respect to one another by one pole-pitch but electrically coinciding in phase. Such an arrangement offers the advantage of balancing the forces acting on the rotor, other than those producing the torque, and of considerably reducing the eddy-current losses.

Lastly, FIG. 2 shows that the projections 24 of the intended crown 23 are shifted by an angle γ with respect to the axis of the winding poles.

The micromotor just described operates as follows.

The magnet-disk 11 of the rotor 10 being of course provided with the same number of poles as the winding 25–28 of the stator 20, each of the said poles , in the absence of supply current, is immobilized opposite one of the projections 24 of the indented crown 23 and is therefore located in proximity to a pair of like radial branches R1, R2 of the electric circuits 27, 28 of the winding. Consequently, when a current impulse of a given polarity is applied to the latter, the electromagnetic forces acting upon the various magnetic poles of the rotor are in one and the same direction and therefore add to one another to produce a torque in the corresponding direction. The action of this torque upon the rotor 10 during the supply impulses causes it to rotate in the corresponding direction by a fraction of pole-pitch, the amplitude of which is sufficient to enable each magnetic pole of the rotor to be moved, at the end of the said impulse and by an effect of least reluctance, opposite the projection 24 of the indented crown 23 following the one opposite which it was immobilized initially. The relative arrangement of the magnetic poles of the rotor being thus permuted with respect to the windings 25–28, it is sufficient to apply to the latter another impulse of opposite polarity to cause the rotor to rotate by a further pitch, and so on. On the whole, the rotor 10 therefore rotates step by step at a speed corresponding to the recurrent frequency of the impulses supplied to the winding 25–28, divided by the number of poles of the said winding. Otherwise stated, the micromotor according to the invention acts as a frequency divider.

In order that a micromotor according to the invention may be used to drive the movement of a timing or time-keeping apparatus, it is therefore sufficient to apply thereto supply impulses of predetermined frequency corresponding to the rotary speed of the wheel driven by the motor, multiplied by the drive ratio and by the number of poles of the said motor. Thus, the six-pole motor described and illustrated being assumed to drive the seconds-wheel through the medium of a transmission the ratio of which is 10, should be supplied with alternate-polarity impulses succeeding each other at one-second intervals, i.e. at the current frequency of 1 cps. Under such conditions, the seconds-hand will perform, as required, one revolution per minute, at the rate of 60 successive steps. The same result may also be obtained by driving directly the seconds-wheel by means of a 60-pole motor supplied with the same frequency, since there would be no difficulty in making such a motor by the technical means described hereinabove. The use of a motor provided with a great nomber of poles will also be advantageous in case of indirect transmission, inasmuch as the supply frequency will be multiplied in proportion to the number of poles of the motor, a condition that is favourable to a high efficiency and a good stability in operation of the oscillator producing the supply impulses for the motor. As a rule, when a micromotor according to the invention is to be used for horological purposes, the selective number of poles of the motor will advantageously be equal to a diviser or multiple of 60, depending on the needs in each specifid application.

Figure 4:
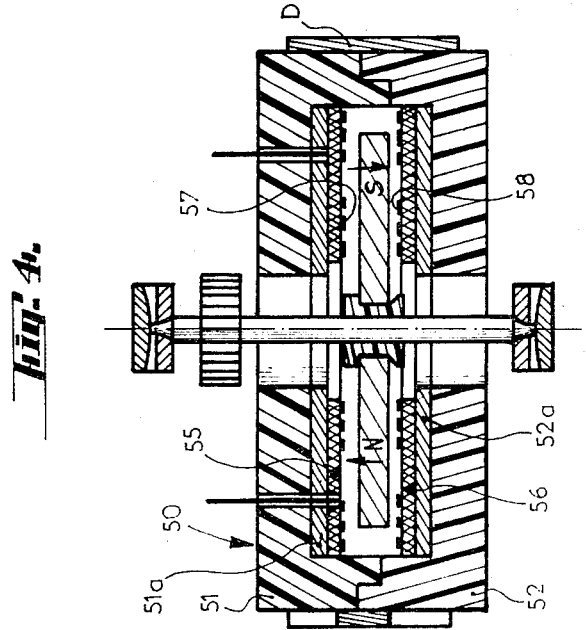

Inversely, it may be interesting the some cases to reduce as much as possible the number of poles and therefore to make a two-pole micromotor such as the one shown in FIGS. 4 and 5.

Such a micromotor has substantially the same structure and is obtained by the same technical means as the six-pole micromotor described in the foregoing. Consequently, only the specific aspects of its design will be described in detail.

The rotor 40 of the micromotor of FIG. 4 is similar to the rotor 10 but is of course provided with only two diametrically opposed magnetic poles N, S. The stator 50 is composed of two cup-shaped members 51, 52 made from a non-magnetic material, e.g. synthetic resin, the internal faces of which carry respectively two annular disks 51a, 52a of a mild magnetic material, and round which is mounted a sleeve D also made from a magnetic material and the thickness or height of which is locally increased so as to fix the stop position of the rotor 40. Advantageously, the sleeve D is mounted rotatably with a tight fit on the cup-shaped members 51, 52 so as to enable the said stop position to be adjusted.

Each of the magnetic disks 51a, 52a is covered with an insulating annular plate 55, 56 carrying a circuit 57, 58 formed by way of electro-deposition. The configuration of the said circuits appears in FIG. 5 which shows a top view of the plate 56 separately. The circuit 58 carried by this plate comprises two diametrally opposed radial branches R1, R2, each of which is provided with six equidistantly arranged conductors, and external and internal peripheral junctions P1, P2 respectively, by which the said conductors are interconnected in series to form a flat two-pole winding. When the impulse polarity is as shown, the currents flowing through the conductors of the radial branches R1, R2 are therefore centrifugal and centripetal, and conversely when the polarity is inversed. It will be observed that two consecutive internal and external peripheral junctions P1, P2, respectively, are in mutually opposite directions and not in one and the same direction as shown in FIG. 2, so as to form two substantially symmetrical flat windings interconnected by a radial conductor.

In addition to this freedom of choice of the number of poles of the motor, its structure may be readily adapted to suit the needs of each specific application by changing the configuration and relative arrangement of the elements of its winding. Thus, the structure of the motor as described and illustrated may be simplified by substituting the ferrite magnet disk 11 by a disk of non-magnetic material carrying in proximity to its periphery inserts of hard magnetic material which are magnetized either alternately in one direction and the other or all of them in one and the same direction, in which case fictive unlike poles are intercalated between the said inserts ; the rotor may also consist of a disk of mild magnetic material, one face of which is covered with a ferro-magentic oxide film or other equivalent film, and the corresponding half of its stator is retained ; conversely, the structure of the motor may be rendered more complex, for instance by stacking on either side of its rotor several winding plates, each comprising one or two electric circuits ; in this case, the like radial branches of these circuits may remain axially aligned or may be shifted angularly, the electric circuits then being fed sequentially according to the sequence of increasing shifts ; such an arrangement may besides enable the motor to be supplied with "polyphase" impulse currents.

Of course the invention is by no means limited to the forms of embodiment described and illustrated, which have been given by way of example only. In particular, it comprises all the means constituting technical equivalents to the means described as well as their combinations, should the latter be carried out according to the spirit of the invention.

What is claimed is:

1. In a brushless stepping micromotor for driving the second-wheel of the movement of a relatively small time-keeping device such as a wristwatch, a rotor constituted by a flat circular disk which is at least partly permanently magnetized and which has a plurality of poles which are symmetrically distributed circumferentially around the center of said disk with a north pole followed by a south pole, an arbor extending perpendicularly through the center of said disk and carrying the same, said arbor having a pair of opposed free ends distant from said disk, a pair of bearings supporting said arbor at said free ends thereof for free rotary movement, said arbor carrying a pinion for transmitting a drive to the second-wheel of the movement, and a stator constituted by at least one annular member of soft magnetic material surrounding said arbor coaxially with respect to said rotor on one side of said disk and defining an air gap therewith, at least one annular plate of electrically non-conductive material situated in said air gap and carrying at least on one side an electrodeposited winding consisting of a single continuous conductor and a pair of terminals to which opposite ends of said conductor are electrically connected, said conductor extending from one to the other of said terminals along a continuous uninterrupted path no part of which crosses any othpr part thereof with said path having a plurality of straight branches extending radially with respect to said arbor and a plurality of inner arcuate portions extending circumferentially around said arbor and interconnecting inner ends of said straight branches and a plurality of outer arcuate portions extending circumferentially with respect to said arbor and interconnecting outer ends of said straight radial branches, each of said branches and each of said inner and outer arcuate portions of said path including a plurality of closely spaced portions of said conductor, said straight radial branches being spaced from each other at equal angular distances circumferentially with respect to said arbor, and said stator carrying a magnetic ring circumferentially surrounding and spaced from the periphery of said rotor and having a plurality of enlarged portions respectively aligned with spaces between said straight radial branches, said enlarged portions also being angularly equidistant from each other with each enlarged portion of said ring located closer to one of said straight radial branches than the next-following straight radial branch for determining the stop positions of said rotor, and means electrically connected with said terminals for providing pulses which will rotate said rotor through sixty incremental steps each minute, and said stator and rotor together with the structure carried thereby being small enough to be incorporated into the casing of a time-keeping device such as a wristwatch.

2. The combination of claim 1 and wherein said straight radial branches of said path are respectively provided with the same number of equidistantly spaced conductor portions while said inner and outer arcuate portions are symmetrically arranged for achieving evenly balanced circumferential and radial forces on said rotor.

3. The combination of claim 1 and wherein said stator includes a pair of said annular members respectively situated on opposite sides of said rotor and defining therewith a pair of air gaps, a pair of said annular plates of electrically non-conductive material being situated in said air gaps and each carrying one of said windings.

4. The combination of claim 3 and wherein said conductor progresses from one terminal first radially inwardly toward said arbor along one radial branch then circumferentially along an inner arcuate portion to the next radial branch then outwardly along the latter to an outer arcuate portion and in an opposite direction circumferentially along the latter outer arcuate portion back to said one radial branch to form one loop for progressing along the next outer loop and so on to form a series of loops arranged substantially along a first semicircle and then progressing along a series of loops inwardly at a second semicircle before terminating at the other of said terminals.

5. The combination of claim 3 and wherein said conductor progresses from one of said terminals circumferentially around said arbor a number of times radially inwardly and outwardly along successive straight radial branches first along an inner arcuate portion of said path and then along an outer arcuate portion of said path, and said windings being arranged with said straight radial branches thereof angularly aligned but with the inner arcuate portions of one winding angularly aligned with the outer arcuate portions of the other winding.

6. The combination of claim 3 and wherein said ring is situated between said annular members of said stator and includes inner projections extending inwardly toward the periphery of said rotor and forming said enlarged portions of said ring.

7. The combination of claim 3 and wherein said ring surrounds and is frictionally carried by said annular members of said stator.

* * * * *